US010234868B2

(12) United States Patent
Lavoie et al.

(10) Patent No.: US 10,234,868 B2
(45) Date of Patent: *Mar. 19, 2019

(54) MOBILE DEVICE INITIATION OF VEHICLE REMOTE-PARKING

(71) Applicant: Ford Global Technologies, LLC, Dearborn, MI (US)

(72) Inventors: Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/626,033

(22) Filed: Jun. 16, 2017

(65) Prior Publication Data

US 2018/0364737 A1    Dec. 20, 2018

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *G05D 1/02* | (2006.01) | |
| *B62D 15/02* | (2006.01) | |
| *B60W 30/06* | (2006.01) | |

(52) U.S. Cl.
CPC .......... *G05D 1/0285* (2013.01); *B60W 30/06* (2013.01); *B62D 15/0285* (2013.01); *G05D 1/0022* (2013.01)

(58) Field of Classification Search
CPC ... G05D 1/0285; G05D 1/0022; B60W 30/06; B62D 15/0285
See application file for complete search history.

(56) References Cited

U.S. PATENT DOCUMENTS

| | | |
|---|---|---|
| 6,356,828 B1 | 3/2002 | Shimizu |
| 6,476,730 B2 | 11/2002 | Kakinami |
| 6,657,555 B2 | 12/2003 | Shimizu |
| 6,683,539 B2 | 1/2004 | Trajkovic |
| 6,744,364 B2 | 6/2004 | Wathen |

(Continued)

FOREIGN PATENT DOCUMENTS

| | | |
|---|---|---|
| CN | 103818204 A | 5/2014 |
| CN | 104485013 A | 4/2015 |

(Continued)

OTHER PUBLICATIONS

US 9,772,406, 09/2017, Liu (withdrawn)

(Continued)

*Primary Examiner* — Mussa A Shaawat
(74) *Attorney, Agent, or Firm* — James P. Muraff; Neal, Gerber & Eisenberg LLP

(57) ABSTRACT

Method and apparatus are disclosed for mobile device initiation of vehicle remote-parking. An example method for initiating vehicle remote parking includes presenting, via a touchscreen of a mobile device, a first motion track that is predefined by a user and continuous. The example method also includes detecting a travel point of the user on the touchscreen and initiating forward motion during remote parking of a vehicle in response to determining, via a processor, the travel point is moving in a clockwise direction within the first motion track.

20 Claims, 7 Drawing Sheets

(56) References Cited

U.S. PATENT DOCUMENTS

| | | |
|---|---|---|
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 7,042,332 B2 | 5/2006 | Takamura |
| 7,123,167 B2 | 10/2006 | Staniszewski |
| 7,663,508 B2 | 2/2010 | Teshima |
| 7,737,866 B2 | 6/2010 | Wu |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 8,035,503 B2 | 10/2011 | Partin |
| 8,054,169 B2 | 11/2011 | Bettecken |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,587,681 B2 | 11/2013 | Guidash |
| 8,594,616 B2 | 11/2013 | Gusikhin |
| 8,599,043 B2 | 12/2013 | Kadowaki |
| 8,645,015 B2 | 2/2014 | Oetiker |
| 8,655,551 B2 | 2/2014 | Danz |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,233,710 B2 | 1/2016 | Lavoie |
| 9,273,966 B2 | 3/2016 | Bartels |
| 9,283,960 B1 | 3/2016 | Lavoie |
| 9,286,803 B2 | 3/2016 | Tippelhofer |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,469,247 B2 | 10/2016 | Juneja |
| 9,493,187 B2 | 11/2016 | Pilutti |
| 9,506,774 B2 | 11/2016 | Shutko |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,914,333 B2 | 3/2018 | Shank |
| 9,959,763 B2 | 5/2018 | Miller |
| 2003/0060972 A1 | 3/2003 | Kakinami |
| 2003/0098792 A1 | 5/2003 | Edwards |
| 2005/0030156 A1 | 2/2005 | Alfonso |
| 2005/0099275 A1 | 5/2005 | Kamdar |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0289813 A1 | 11/2009 | Kwiecinski |
| 2009/0313095 A1 | 12/2009 | Hurpin |
| 2010/0114471 A1 | 5/2010 | Sugiyama |
| 2010/0114488 A1 | 5/2010 | Khamharn |
| 2010/0152972 A1 | 6/2010 | Attard |
| 2010/0156672 A1 | 6/2010 | Yoo |
| 2010/0259420 A1 | 10/2010 | Von Reyher |
| 2011/0071725 A1 | 3/2011 | Kleve |
| 2011/0082613 A1 | 4/2011 | Oetiker |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0303258 A1 | 11/2012 | Pampus |
| 2012/0323643 A1 | 12/2012 | Volz |
| 2012/0323700 A1 | 12/2012 | Aleksandrovich et al. |
| 2013/0021171 A1 | 1/2013 | Hsu |
| 2013/0024202 A1 | 1/2013 | Harris |
| 2013/0073119 A1 | 3/2013 | Huger |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar et al. |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0096051 A1 | 4/2014 | Boblett |
| 2014/0121930 A1 | 5/2014 | Allexi |
| 2014/0147032 A1 | 5/2014 | Yous |
| 2014/0188339 A1 | 7/2014 | Moon |
| 2014/0222252 A1 | 8/2014 | Matters et al. |
| 2014/0240502 A1 | 8/2014 | Strauss |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |

(56) References Cited

U.S. PATENT DOCUMENTS

| | | |
|---|---|---|
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1* | 6/2015 | Chen ............... H04W 4/16 455/418 |
| 2015/0203111 A1 | 7/2015 | Bonnet |
| 2015/0219464 A1 | 8/2015 | Beaurepaire |
| 2015/0220791 A1* | 8/2015 | Wu ............... G06K 9/00812 348/148 |
| 2015/0226146 A1 | 8/2015 | Elwart |
| 2015/0274016 A1 | 10/2015 | Kinoshita et al. |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0371541 A1 | 12/2015 | Korman |
| 2015/0375741 A1 | 12/2015 | Kiriya |
| 2015/0375742 A1 | 12/2015 | Gebert |
| 2016/0012726 A1 | 1/2016 | Wang |
| 2016/0055749 A1 | 2/2016 | Nicoll |
| 2016/0153778 A1 | 2/2016 | Singh |
| 2016/0062354 A1 | 3/2016 | Li |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0170494 A1 | 6/2016 | Bonnet et al. |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0236680 A1 | 8/2016 | Lavoie |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman et al. |
| 2016/0321926 A1 | 11/2016 | Mayer |
| 2016/0334797 A1 | 11/2016 | Ross |
| 2016/0355125 A1 | 12/2016 | Herbert |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang et al. |
| 2017/0001650 A1 | 1/2017 | Park |
| 2017/0008563 A1 | 1/2017 | Popken et al. |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1* | 3/2017 | Bostick ............... G08G 1/143 |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1* | 7/2017 | Vogt ............... G05D 1/0038 |
| 2017/0200369 A1 | 7/2017 | Miller |
| 2017/0208438 A1 | 7/2017 | Dickow |
| 2017/0297385 A1 | 10/2017 | Kim |
| 2018/0024559 A1 | 1/2018 | Seo |
| 2018/0043884 A1* | 2/2018 | Johnson ............... B60W 30/06 |
| 2018/0194344 A1* | 7/2018 | Wang ............... B60W 30/06 |

FOREIGN PATENT DOCUMENTS

| | | |
|---|---|---|
| CN | 104691544 A | 6/2015 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106945662 A | 7/2017 |
| DE | 3844340 A1 | 7/1990 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102012008858 A1 | 11/2012 |
| DE | 102011122421 A1 | 6/2013 |
| DE | 102012200725 A1 | 7/2013 |
| DE | 102013004214 A1 | 9/2013 |
| DE | 102010034129 B2 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A | 12/2015 |
| DE | 102014011802 A1 | 2/2016 |
| DE | 102014111570 A1 | 2/2016 |
| DE | 102014015655 A1 | 4/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| EP | 2289768 A2 | 3/2011 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| GB | 2344481 A | 6/2000 |
| GB | 2481324 A | 6/2011 |
| GB | 2491720 A | 12/2012 |
| GB | 2497836 A | 12/2012 |
| JP | 2004142543 A | 5/2004 |
| JP | 2004287884 A | 10/2004 |
| JP | 2005193742 A | 7/2005 |
| JP | 2009090850 A | 4/2009 |
| JP | 2014125196 A | 7/2014 |
| JP | 2014134082 A | 7/2014 |
| JP | 5918683 B2 | 5/2016 |
| JP | 2016119032 A | 6/2016 |
| KR | 20090040024 A | 4/2009 |
| KR | 20100006714 A | 1/2010 |
| KR | 20130106005 A | 9/2013 |
| KR | 20160039460 A | 4/2016 |
| KR | 20160051993 A | 5/2016 |
| WO | WO 2006/064544 A1 | 6/2006 |
| WO | WO 2008/055567 A1 | 5/2008 |
| WO | WO 2010/006981 A1 | 1/2010 |
| WO | WO 2011/141096 A1 | 11/2011 |
| WO | WO 2013/056959 A1 | 4/2013 |
| WO | WO 2014/103492 A1 | 7/2014 |
| WO | WO 2015/068032 A1 | 5/2015 |
| WO | WO 2015193058 A1 | 12/2015 |
| WO | WO 2016/046269 A1 | 3/2016 |
| WO | WO 2016/128200 A1 | 8/2016 |
| WO | WO 2017/062448 A1 | 4/2017 |
| WO | WO 2017/073159 A1 | 5/2017 |

(56) References Cited

FOREIGN PATENT DOCUMENTS

| WO | WO 2017/118510 A1 | 7/2017 |
|----|-------------------|--------|
| WO | WO 2017/125514 A1 | 7/2017 |

OTHER PUBLICATIONS

Land Rover develops a smartphone remote control for its SUVs, James Vincent, Jun. 18, 2015.
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, IParking: An Intelligent Indoor Location-Based Smartphone Parking Service, Oct. 31, 2012, 15 pages.
Alberto Broggi and Elena Cardarelli, Vehicle Detection for Autonomous Parking Using a Soft-Cascade Ada Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Perpendicular Parking—https://prezi.com/toqmfyxriksl/perpendicular-parking/.
Search Report dated Jan. 19, 2018 for GB Patent Application No. 1711988.4 (3 pages).
Search Report dated Jul. 11, 2017 for GB Patent Application No. Enter 15/583,524, pp. 3.
Search Report dated May 21, 2018 for Great Britain Patent Application No. GB 1800277.4 (5 Pages).
Search Report dated Nov. 28, 2017, for GB Patent Application No. GB 1710916.6 (4 Pages).
Vehicle'S Orientation Measurement Method by Single-Camera Image Using Known-Shaped Planar Object, Nozomu Araki, Takao Sato, Yasuo Konishi and Hiroyuki Ishigaki, 2010.

* cited by examiner

MOBILE DEVICE INITIATION OF VEHICLE REMOTE-PARKING

CROSS-REFERENCE TO RELATED APPLICATIONS

This application relates to U.S. patent application Ser. No. 15/626,024 filed Jun. 16, 2017 and U.S. patent application Ser. No. 15/626,036 filed Jun. 16, 2017, both of which are incorporated by reference in their entireties.

TECHNICAL FIELD

The present disclosure generally relates to vehicle parking and, more specifically, to mobile device initiation of vehicle remote-parking.

BACKGROUND

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for mobile device initiation of vehicle remote-parking. An example disclosed method for initiating vehicle remote parking includes presenting, via a touchscreen of a mobile device, a first motion track that is predefined by a user and continuous. The example disclosed method also includes detecting a travel point of the user on the touchscreen and initiating forward motion during remote parking of a vehicle in response to determining, via a processor, the travel point is moving in a clockwise direction within the first motion track.

An example disclosed tangible computer readable medium includes instructions which, when executed, cause a machine to present, via a touchscreen of a mobile device, a first motion track that is predefined by a user and continuous. The instructions which, when executed, also cause the machine to detect a travel point of the user on the touchscreen and initiate remote parking of a vehicle in response to determining, via a processor, the travel point is moving within the first motion track.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
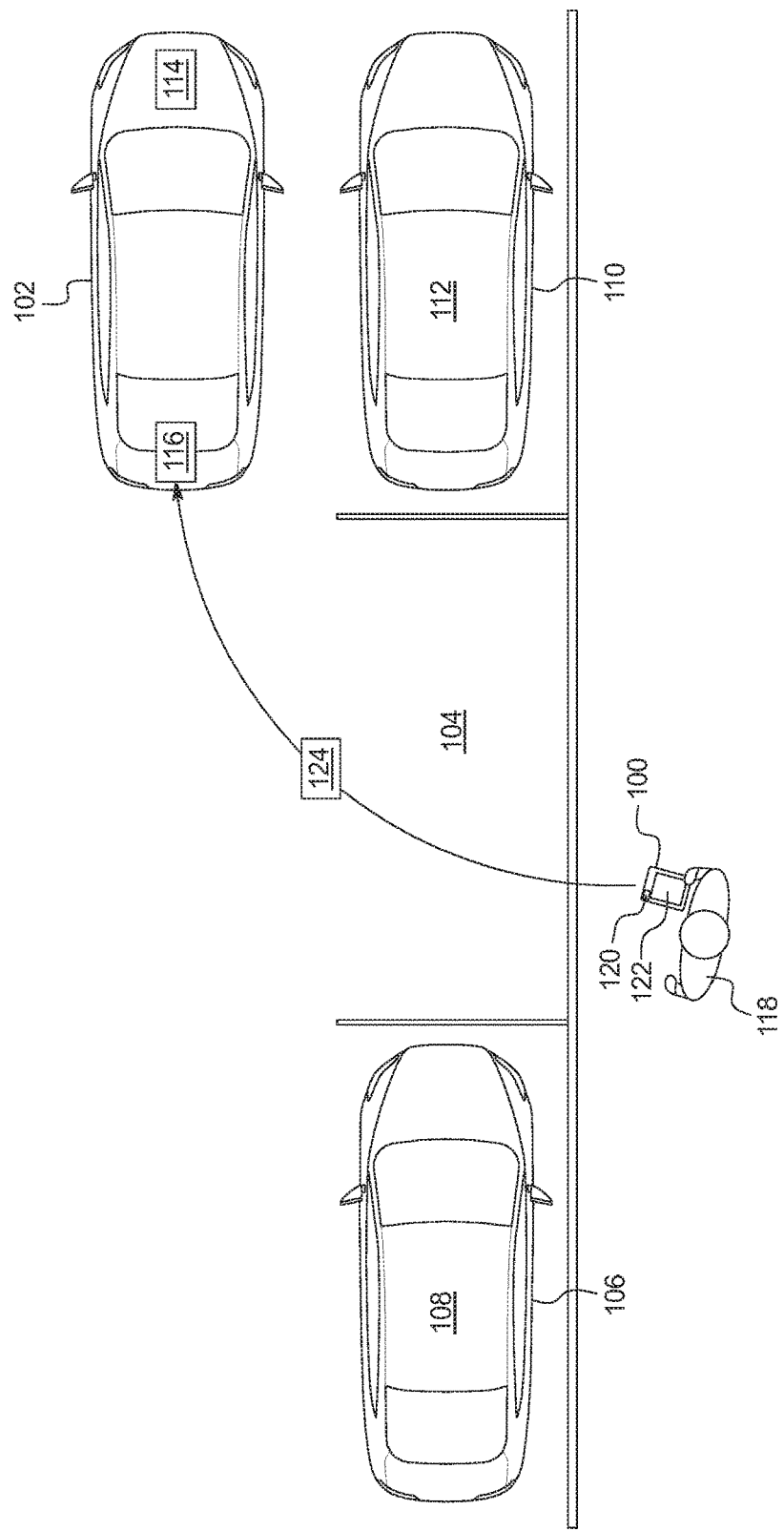
FIG. 1 illustrates an example mobile device initiating remote parking of an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead.

Further, some vehicles include park-assist features (e.g., a remote park-assist feature) in which the vehicle autonomously controls motive functions of the vehicle to park the vehicle into a parking spot. A remote park-assist feature autonomously parks a vehicle when a driver of the vehicle has already exited the vehicle. For example, the driver may position the vehicle near a parking spot, exit the vehicle, and remotely instruct the vehicle (e.g., via a button on a key fob or mobile device) to autonomously park in the parking spot. A driver may utilize remote parking to park a vehicle in a parking spot in which a driver would subsequently be unable to exit a cabin of the vehicle (e.g., due to a nearby vehicle, wall, or other structure).

The example methods, apparatus, and machine readable media include a mobile device that presents continuous motion tracks for a user to trace with his or her finger via a touchscreen of the mobile device to initiate remote parking of a vehicle. To enable the user to quickly initiate starting and stopping of remote parking of the vehicle, an autonomy unit of the vehicle causes the vehicle to move during remote parking only when the user is moving his or her finger (e.g., thumb), conductive stylus, and/or prosthetic digit within a motion track along the touchscreen. The motion tracks of the examples disclosed herein are predefined by the user and may be any continuous shape (e.g., non-circular, non-elliptical, wavy, obtuse, etc.) that reflects a natural motion or hand-movement of the user to facilitate the user in easily tracing the motion track that initiates remote parking of the vehicle.

Example mobile devices disclosed herein includes a touchscreen that presents a continuous motion track (e.g., a first motion track) that is predefined by a user. As used herein, a "predefined motion track" and a "motion track that is predefined by a user" refer to a continuous track that is presented via the touchscreen to initiate remote parking of vehicle and has been defined based on input from a user prior to being presented via the toucshcreen. For example, to define a predefined motion track, a path former of the mobile device detects a plurality motion paths that are received via the touchscreen from the user and defines the motion track based on the plurality of motion paths (e.g., by averaging the plurality of motion paths together). As used herein, a "continuous track" and a "continuous path" refers to a path having no start point and no end point (e.g., a circle, an oval, a stadium, etc.) that forms a closed geometric shape.

Upon presenting the motion track to the user, the touchscreen detects a travel point that corresponds to a location of the touchscreen that is touched or pressed by the user. Further, the example mobile devices disclosed herein include a parking initiator that determines whether the touch point is moving within the motion track. In response to determining that the travel point is moving in a clockwise direction within the motion track, the parking initiator of the mobile device wirelessly sends a signal to a vehicle to initiate forward motion during remote parking of the vehicle. As used herein, "remote parking" and "remote park-assist" refer to a vehicle controlling motive functions of the vehicle without direct steering or velocity input from a driver to autonomously park the vehicle into a parking spot while the driver is located outside of the vehicle. For example, a remote park assist-system of an autonomy unit controller the motive functions of the vehicle upon initiation from a driver to remotely park the vehicle into a parking spot.

In some examples, the parking initiator of the mobile device wirelessly sends a signal to the vehicle to initiate backward motion during remote parking of the vehicle in response to determining that the travel point is moving in a counterclockwise direction within the motion track. Further, in some examples, a speed of motion of the travel point within the motion track corresponds to a travel speed of the vehicle during remote parking (e.g., the faster the user moves the travel point, the faster the vehicle moves during remote parking).

Additionally or alternatively, in response to determining that the travel point is located and/or moving outside of the motion path, the parking initiator causes the mobile device to present a warning (e.g., a visual warning, an audio warning, a haptic warning, etc.) to the user so that the user may move the travel point back into the motion path to initiate remote parking of the vehicle. In some examples, the parking initiator sends a signal to the vehicle to stop remote parking of the vehicle in response to determining that the travel point has been outside of the motion track for at least a predetermined time threshold and/or is located away from the motion track by at least a predetermined distance threshold.

The example mobile devices disclosed herein may present, via the touchscreen, additional continuous motion tracks that are designated for different configurations of the mobile device. Each of the predefined motion tracks may be designated for a particular direction of travel of the vehicle, a particular orientation of the mobile device, a particular hand holding the mobile device, etc.

For example, the touchscreen of the mobile device presents another motion track (e.g., a second motion track) that is different than the first motion track, predefined by the user, and continuous. In some examples, the second motion track has a different shape and/or a different location on the touchscreen relative to the first motion track. When the second motion track is presented via the touchscreen, the parking initiator sends a signal to the vehicle to initiate backward motion during remote parking of the vehicle in response to determining that the travel point is moving in a counterclockwise direction within the second motion track. That is, the touchscreen presents the first motion track to facilitate forward motion during remote parking of the vehicle and presents the second motion track to facilitate backward motion during remote parking of the vehicle.

Additionally or alternatively, the touchscreen of the mobile device presents another motion track (e.g., a third motion track) that is different than the first motion track, predefined by the user, and continuous. Further, the third motion track may have a different shape and/or a different location on the touchscreen relative to the first motion track. The touchscreen presents the first motion track in response to detecting that the mobile device is in a portrait orientation and presents the third motion track in response to detecting that the mobile device is in a landscape orientation. For example, the mobile device includes an accelerometer to enable the mobile device to determine the orientation of the mobile device.

Further, in some examples, the touchscreen of the mobile device presents another motion track (e.g., a fourth motion track) that is different than the first motion track, predefined by the user, and continuous. The fourth motion track may have a different shape and/or a different location on the touchscreen relative to the first motion track. The touchscreen presents the first motion track in response to detecting that a right hand of the user is holding the mobile device and presents the fourth motion track in response to detecting that a left hand of the user is holding the mobile device. For example, the mobile device includes an accelerometer and/or a camera to enable the mobile device to determine which hand of the user is holding the mobile device.

Further, in some examples, the touchscreen of the mobile device presents an adjustment mode that enables the user to adjust a location of the motion track on the mobile device. For example, when the user picks a calibration icon on the touchscreen, the mobile device enables the motion track to float to another position on the touchscreen. That is, the mobile device enables the user to reposition or adjust the motion track to another position on the touchscreen that is more ergonomically comfortable for the user without requiring the user to redefine a shaped of the motion track. Additionally or alternatively, when defining the motion track, the mobile device prevents the user from defining and/or presents a warning when the user attempts to define the motion track along an edge of the touchscreen.

Turning to the figures, FIG. 1 illustrates an example mobile device 100 initiating remote parking of an example vehicle 102 in accordance with the teachings herein. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, wheels, etc. The vehicle 102 may be semi-autonomous (e.g., some routine motive functions controlled by the vehicle 102) or autonomous (e.g., motive functions are controlled by the vehicle 102 without direct driver input).

As illustrated in FIG. 1, the vehicle 102 is positioned to be remotely parked in an available parking spot 104. The available parking spot 104 is positioned between an occupied parking spot 106 (e.g., a first occupied parking spot) that is occupied by a parked vehicle 108 (e.g., a first parked vehicle) and another occupied parking spot 110 (e.g., a second occupied parking spot) by another parked vehicle 112 (e.g., a second parked vehicle). In the illustrated example, the available parking spot 104 is a parallel parking spot. In other examples, the available parking spot 104 into which the vehicle 102 is to park is a perpendicular or other non-parallel parking spot. In the illustrated example, the vehicle 102 is positioned next to the occupied parking spot 106 and/or the parked vehicle 108 to enable the vehicle 102 to be parallel parked in the available parking spot 104 via remote park-assist.

The vehicle 102 of the illustrated example includes an autonomy unit 114. The autonomy unit 114 is an electronic control unit (ECU) of the vehicle 102 that autonomously controls motive functions of the vehicle 102 to remotely park the vehicle 102 in available parking spots (e.g., the available parking spot 104) and/or otherwise autonomously drives the vehicle 102. For example, the autonomy unit 114 controls the motive functions of the vehicle 102 based on data collected from sensor(s) of the vehicle 102 (e.g., sensors 904 of FIG. 9).

The vehicle 102 also includes a communication module 116 (e.g., a first communication module). For example, the communication module 116 is a short-range wireless module for wireless communication with mobile device(s) of user(s) of the vehicle 102. In the illustrated example, the communication module 116 is communicatively connected to a mobile device 100 of a user 118 of the vehicle 102. The communication module 116 includes hardware and firmware to establish a connection with the mobile device 100. In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 116 may use WiFi, WiMax, NFC, UWB (Ultra-Wide Band), and/or any other communication protocol that enables the communication module 116 to communicatively couple to the mobile device 100.

Prior to communicating with the mobile device 100, the communication module 116 may authenticate the mobile device 100 for communication with the communication module 116. To authenticate communication between the communication module 116 and the mobile device 100, the communication module 116 intermittently broadcasts a beacon (e.g., a low-energy beacon such as Bluetooth® low-energy (BLE) beacon). When the mobile device 100 is within a broadcast range of the communication module 116, the mobile device 100 receives the beacon and subsequently sends an encryption key. The communication module 116 authenticates the mobile device 100 for communication module 116 upon receiving the key from the mobile device 100.

In the illustrated example, the user 118 (e.g., a driver of the vehicle 102) utilizes the mobile device 100 (e.g., a smart phone, a smart watch, a wearable, a tablet, etc.) to initiate remote parking of the vehicle 102 into the available parking spot 104. As illustrated in FIG. 1, the mobile device includes a communication module 120 and a touchscreen 122.

The communication module 120 communicatively connects with other communication modules. For example, the communication module 120 is a short-range wireless module that wirelessly connects to the communication module 116 to establish communication between the mobile device 100 and the vehicle 102. The communication module 120 includes hardware and firmware to establish a connection with the communication module 116 of the vehicle 102. In some examples, the communication module 116 implements WiFi, Bluetooth® and/or Bluetooth® Low Energy (BLE) protocols.

The touchscreen 122 of the mobile device 100 provides an interface between the user 118 and the mobile device 100 to enable the user 118 to initiate remote parking of the vehicle 102. For example, the touchscreen 122 is a resistive touchscreen, a capacitive touchscreen, and/or any other type of touchscreen that displays output information to and tactilely receives input information from the user 118 of the mobile device 100. In some examples, the mobile device 100 also includes other input devices (e.g., buttons, knobs, microphones, etc.) and/or output devices (e.g., speakers, LEDs, etc.) to receive input information from and/or provide output information to the user 118 of the mobile device 100. In operation, the user 118 interacts with the touchscreen 122 for initiating remote parking of the vehicle 102 via the mobile device 100. Based on input received from the user 118 via the touchscreen 122, the communication module 120 of the mobile device sends a signal 124 to the communication module 116 of the vehicle 102 that instructs the autonomy unit 114 to initiate remote parking of the vehicle 102.

Figure 2:
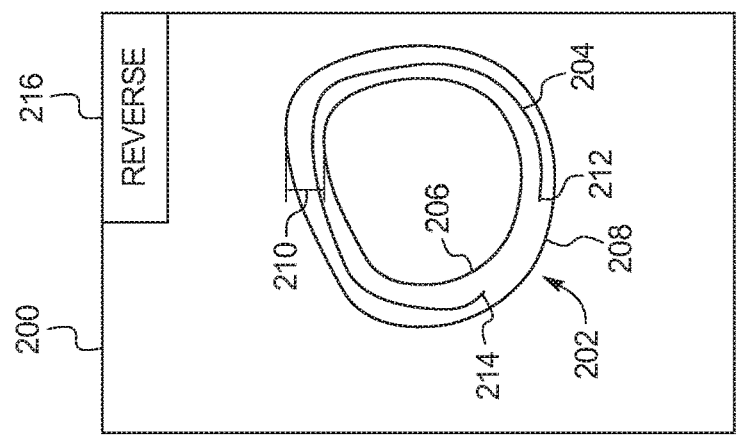
FIG. 2 illustrates an example motion track and an example travel path presented via a touchscreen of the mobile device of FIG. 1 in accordance with the teachings herein.

FIG. 2 illustrates an example display 200 of the touchscreen 122 of the mobile device 100 in accordance with the teachings herein. The display 200 includes a motion track 202 (e.g., a first motion track) presented via the touchscreen 122 that is continuous and predefined by the user 118. The user 118 interacts with the motion track 202 by drawing a travel path 204 on the touchscreen 122 within the motion track 202 to define a pattern he or she desires to use to initiate remote parking of the vehicle 102 within the available parking spot 104.

As illustrated in FIG. 2, the motion track 202 is defined by an inner boundary 206 and an outer boundary 208. The inner boundary 206 and the outer boundary 208 are spaced apart by a distance and/or a number of pixels of the touchscreen 122 such that the motion track 202 has a width 210 defined by the distance and/or the number of pixels between the inner boundary 206 and the outer boundary 208. In some examples, the width 210 of the motion track 202 is predefined by the user 118 and/or software utilized for remote parking the vehicle 102 via the mobile device 100. In some examples, the width 210 of the motion track 202 is defined based on a difference between motion paths (e.g., motion paths 302 of FIG. 3) the user 118 provides via the touchscreen 122 to define a route, direction, location, and/or other characteristic of the motion track 202.

The display 200 of the illustrated example also includes the travel path 204 that the user 118 provides via the touchscreen 122 to initiate remote parking of the vehicle 102. The travel path 204 is a contiguous line that the user 118 draws via the touchscreen 122. As illustrated in FIG. 2, the travel path 204 includes an initial point 212 and a travel point 214 opposite the travel point 214. The initial point 212 corresponds to a location on the touchscreen 122 at which the user 118 begins to draw the travel path 204. The travel point 214 corresponds to a location on the touchscreen 122 at which the user 118 is currently touching or pressing the touchscreen 122 to continue drawing the travel path 204.

The touchscreen 122 detects the travel point 214, the initial point 212, and points of the travel path 204 therebetween to determine whether the mobile device 100 is to send the signal 124 to the autonomy unit 114 of the vehicle 102 to initiate remote parking of the vehicle 102. For example, based on the information collected by the touchscreen 122, the mobile device 100 determines whether the travel point 214 is moving within the motion track 202. Further, in some examples, the mobile device 100 determines in which direction the travel point 214 is moving within the motion track 202 by comparing the travel point 214 (i.e., the current location) to the initial point 212 (i.e., the starting location) and all points of the travel path 204 therebetween. Based on the movement of the travel point 214 on the display 200 detected via the touchscreen 122, the mobile device 100 wirelessly sends the signal 124 to the autonomy unit 114 of the vehicle 102, via the communication module 116 and the communication module 120, to initiate remote parking of the vehicle 102.

In some examples, the mobile device 100 is configured to send the signal 124 to initiate remote parking of the vehicle 102 such that the autonomy unit 114 continues to remotely park the vehicle 102 as long as the touchscreen 122 continues to detect movement of the travel point 214 within the travel path 204. That is, the autonomy unit 114 performs both forward and backward maneuvers during remote parking the vehicle 102 in response to the touchscreen 122 continuing to detect movement of the travel point 214 within the motion track 202 (e.g., in a clockwise direction and/or a counterclockwise direction).

In some examples, the mobile device 100 is configured to send the signal 124 to initiate movement of the vehicle 102 in a particular direction during remote parking based on the detected direction of movement of the travel point 214 within the motion track 202. For example, the communication module 120 of the mobile device 100 sends the signal 124 to the vehicle 102 to initiate forward motion during remote parking of the vehicle 102 in response to the touchscreen 122 detecting that the travel point 214 is moving in a clockwise direction within the motion track 202. In some such examples, the communication module 120 of the mobile device 100 sends the signal 124 to initiate backward motion during remote parking of the vehicle 102 in response to the touchscreen 122 detecting that the travel point 214 is moving in a counterclockwise direction within the motion track 202. In other such examples, movement of the travel point 214 in the counterclockwise direction corresponds to forward motion of the vehicle 102, and movement of the travel point 214 in the clockwise direction corresponds to backwards motion of the vehicle 102. Further, in other examples, the motion track 202 of the display 200 is designated only for initiating forward motion during remote parking when the travel point 214 is moving in the clockwise direction within the motion track 202. The display 200 of the illustrated example includes a reverse button 216 that presents another display with another motion track (e.g., a display 400 with a motion track 402 of FIG. 4) designated only for initiating backward motion when selected by the user 118.

Further, in some examples, a speed of motion of the travel point 214 detected via the touchscreen 122 corresponds to a travel speed of the vehicle 102 during remote parking. For example, the faster the user 118 moves the travel point 214 along the touchscreen 122, the faster the autonomy unit 114 moves the vehicle 102 during remote parking. Likewise, the slower the user 118 moves the travel point 214 along the touchscreen 122, the slower the autonomy unit 114 moves the vehicle 102 during remote parking.

When the travel point 214 is not within the motion track 202, the mobile device 100 does not send the signal 124 for initiating remote parking of the vehicle 102. Further, in some examples, the mobile device 100 provides an alert to the user 118 when the travel point 214 is outside of the motion track 202. For example, the mobile device 100 provides a visual warning via the touchscreen 122, a haptic warning by vibrating the mobile device 100, and/or an audio warning via speakers of the mobile device 100. Additionally or alternatively, the mobile device 100 provides the alert when the travel point 214 is approaching a boundary (e.g., the inner boundary 206, the outer boundary 208) of the motion track 202. That is, the mobile device 100 provides the alert to the user 118 to facilitate the user 118 in moving the travel point 214 back into the motion track 202 to initiate and/or continue remote parking of the vehicle 102. Additionally or alternatively, the mobile device 100 provides an alert when a user attempts to define a motion path that extends too closely along an edge of the touchscreen 122.

In some examples, the mobile device 100 continues to send the signal 124 for initiating remote parking of the vehicle 102 when the motion track 202 is outside of the motion track 202 for less than the predetermined time threshold and/or by less than the predetermined distance threshold. In such examples, the mobile device 100 provides an alert to the user 118 when the travel point 214 is outside of the motion track 202 for less than the predetermined time threshold and/or by less than the predetermined distance threshold. When the travel point 214 has been outside of motion track 202 for at least the predetermined time threshold and/or is located away from the motion track 202 on the display 200 by at least the predetermined distance threshold, the mobile device 100 sends another signal to the vehicle 102 to stop remote parking of the vehicle 102 and, thus, stop automated movement of the vehicle 102.

Figure 3:
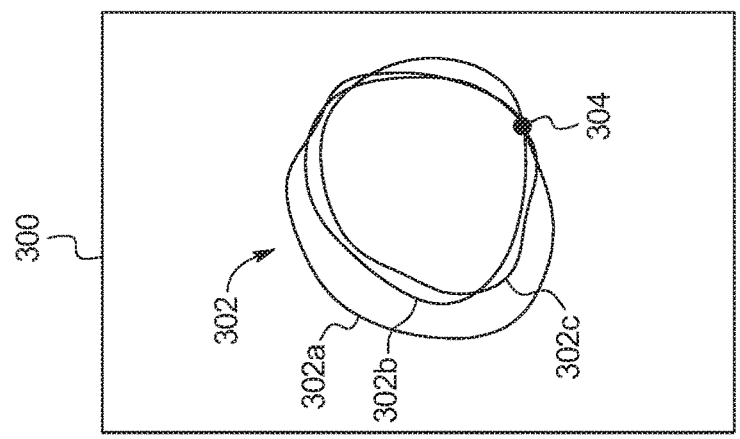
FIG. 3 illustrates example motion paths presented via the touchscreen of FIG. 2.

FIG. 3 illustrates another example display 300 of the touchscreen 122 of the mobile device 100 in accordance with the teachings herein. The display 300 includes motion paths 302 that are received from the user 118 via the touchscreen 122 and are utilized to define a location and a shape of the motion track 202 of the display 200. For example, to enable the user 118 to define the shape and the location of the motion path on the display 200, the user 118 draws a first motion path 302a, a second motion path 302b, and a third motion path 302c. In the illustrated example, the touchscreen 122 receives the the first motion path 302a, the second motion path 302b, and the third motion path 302c that the user 118 provides in one continuous motion starting at an initial point 304. The motion track 202 is determined based on the location and shape of each of the motion paths (e.g., by averaging the location and/or the shape of the motion paths 302 together). In some examples, a variance between the motion paths 302 is utilized to determine the width 210 of the motion track 202. For example, the width 210 of the motion track 202 is smaller the more similar the shape and the location of each of the motion paths 302 are to each other, and the width 210 of the motion track 202 is larger the less similar the shape and the location of each of the motion paths 302 are to each other.

Figure 4:
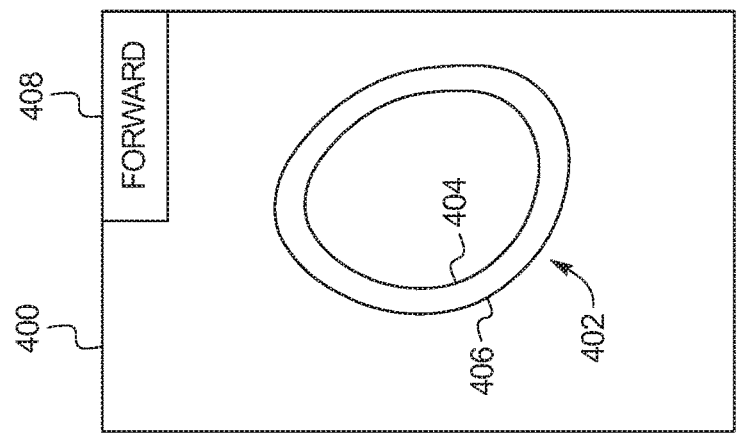
FIG. 4 illustrates another example motion track presented via the touchscreen of FIG. 2.

FIG. 4 illustrates another example display 400 of the touchscreen 122 of the mobile device 100 in accordance with the teachings herein. In the illustrated example, the display 400 includes a motion track 402 (e.g., a second motion track) that is continuous, predefined by the user 118, and is defined by an inner boundary 404 and an outer boundary 406. As illustrated in FIG. 4, the motion track 402 has a different shape, size, and/or location on the touchscreen 122 relative to that of the motion track 202. The motion track 402 is designated only for initiating backward motion during remote parking of the vehicle 102. The mobile device 100 sends the signal 124 to initiate the backward motion during remote parking of the vehicle 102 in response to the touchscreen 122 detecting that the travel point 214 is moving in a counterclockwise direction within the motion track 402. That is, the display 200 is utilized to initiate forward motion during remote parking when the travel point 214 is moving in the clockwise direction within the motion track 202 of the display 200, and the display 400 is utilized to initiate backward motion during remote parking when the travel point 214 is moving in the counterclockwise direction within the motion track 402 of the display 400. For example, the display 400 includes a forward button 408 that presents the display 200 with the motion track 202 designated only for initiating forward motion when selected by the user 118.

Figure 5:
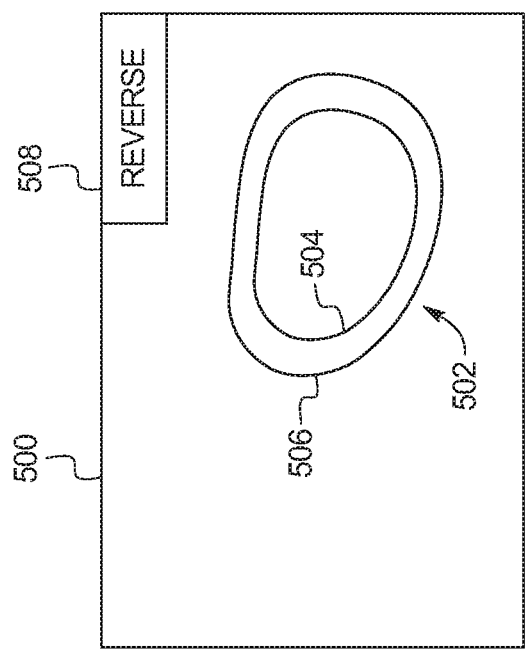
FIG. 5 illustrates another example motion track presented via the touchscreen of FIG. 2.

FIG. 5 illustrates another example display 500 of the touchscreen 122 of the mobile device 100 in accordance with the teachings herein. In the illustrated example, the display 500 includes a motion track 502 (e.g., a third motion track) that is continuous, predefined by the user 118, and is defined by an inner boundary 504 and an outer boundary 506. The motion track 502 has a different shape, size, and/or location on the touchscreen 122 relative to that of the motion track 202 and/or the motion track 402. For example, the display 500 is presented via the touchscreen 122 in response to the mobile device 100 detecting that the mobile device 100 is in a landscape orientation, while the display 200 is presented via the touchscreen 122 in response to the mobile device 100 detecting that the mobile device 100 is in a portrait orientation. In the illustrated example, the motion track 502 of the display 500 is designated only for initiating forward motion during remote parking in response to the touchscreen 122 detecting that the travel point 214 is moving in the clockwise direction within the motion track 502. The display 500 also includes a reverse button 508 that presents another display when the mobile device 100 is in the landscape orientation and is designated only for initiating backward motion when selected by the user 118.

Figure 6:
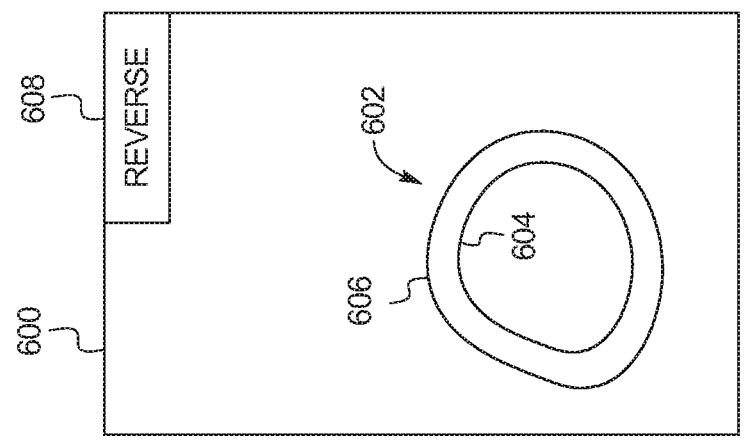
FIG. 6 illustrates another example motion track presented via the touchscreen of FIG. 2.

FIG. 6 illustrates another example display 600 of the touchscreen 122 of the mobile device 100 in accordance with the teachings herein. In the illustrated example, the display 600 includes a motion track 602 (e.g., a fourth motion track) that is continuous, predefined by the user 118, and is defined by an inner boundary 604 and an outer boundary 606. The motion track 502 has a different shape, size, and/or location on the touchscreen 122 relative to that of the motion track 202, the motion track 402, and/or the motion track 502. For example, the display 600 is presented via the touchscreen 122 in response to the mobile device 100 detecting that the mobile device 100 is being held by a right hand of the user 118, while the display 200 is presented via the touchscreen 122 in response to the mobile device 100 detecting that the mobile device 100 is being held by a left hand of the user 118. In the illustrated example, the motion track 602 of the display 600 is designated only for initiating forward motion during remote parking in response to the touchscreen 122 detecting that the travel point 214 is moving in the clockwise direction within the motion track 602. The display 600 also includes a reverse button 608 that presents another display when the mobile device 100 is in the landscape orientation and is designated only for initiating backward motion when selected by the user 118.

Figure 7:
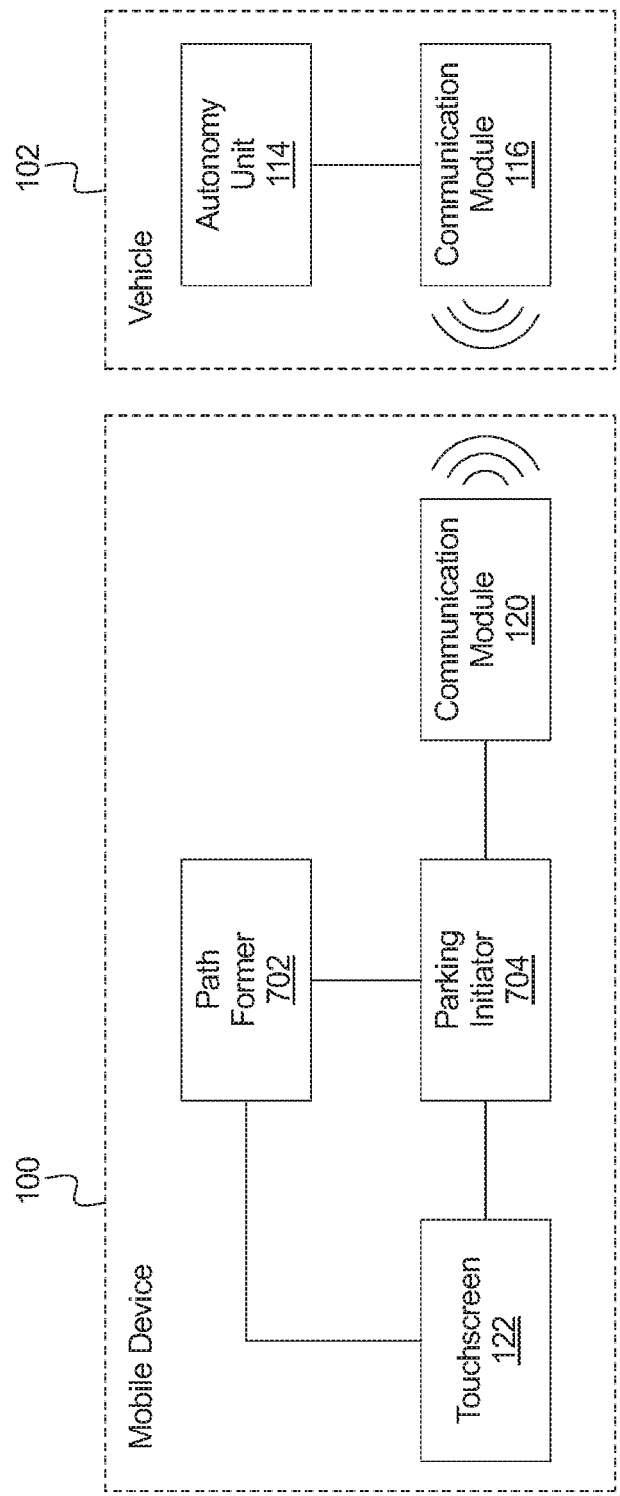
FIG. 7 is a block diagram of the mobile device and the vehicle of FIG. 1.

FIG. 7 is a block diagram of the mobile device 100 and the vehicle 102. As illustrated in FIG. 7, the mobile device 100 includes the touchscreen 122, a path former 702, a parking initiator 704, and the communication module 120. The touchscreen 122 is communicatively connected to the path former 702 and the parking initiator 704, the path former 702 and the parking initiator 704 are communicatively connected together, and the parking initiator 704 is communicatively connected to the communication module 120. Further, the vehicle 102 includes the autonomy unit 114 and the communication module 116 that are communicatively connected together.

The touchscreen 122 presents a display (e.g., the display 200, the display 300, the display 400, the display 500) to the user 118 and receives input from the user 118. For example, the touchscreen 122 detects a motion along which the user touches or presses the touchscreen 122.

For example, to define a motion track (e.g., the motion track 202, the motion track 402, the motion track 502, the motion track 602), the path former 702 detects a plurality motion paths (e.g., the motion paths 302) that are received via the touchscreen 122 from the user 118 and defines the corresponding motion track based the plurality of motion paths (e.g., by averaging the plurality of motion paths together). The path former 702 defines a shape, size, and/or location on the touchscreen 122 based on the plurality of motion paths.

To facilitate initiation of remote parking of the vehicle 102, the touchscreen 122 presents one of the motion tracks predefined by the user 118 via the path former 702. Upon presenting the motion track, the touchscreen 122 detects a travel point (e.g., the travel point 214). The parking initiator 704 of the illustrated example determines whether the touch point is moving within the displayed motion track. In response to determining that the travel point is moving within the motion track, the parking initiator 704 wirelessly sends a signal (e.g., the signal 124), via the communication module and the communication module 116, to the autonomy unit 114 of the vehicle 102 to initiate remote parking of the vehicle 102. In some examples, the parking initiator 704 sends a signal to initiate forward motion during remote parking of the vehicle 102 in response to determining that the travel point is moving in a clockwise direction within the motion track. In some examples, the parking initiator 704 sends a signal to initiate backward motion during remote parking of the vehicle 102 in response to determining that the travel point is moving in a counterclockwise direction within the motion track.

Additionally or alternatively, the parking initiator 704 causes the mobile device 100 to present a warning (e.g., a visual warning, an audio warning, a haptic warning, etc.) to the user 118 in response to determining that the travel point is located and/or moving outside of the motion path. The warning facilitates the user 118 in moving the travel point back into the motion path so that remote parking of the vehicle 102 may be initiated. Further, in some examples, the parking initiator 704 sends a signal to stop remote parking of the vehicle 102 in response to determining that the travel point is outside of the motion track, has been outside of the motion track for at least a predetermined time threshold and/or is located away from the motion track by at least a predetermined distance threshold.

Figure 8:
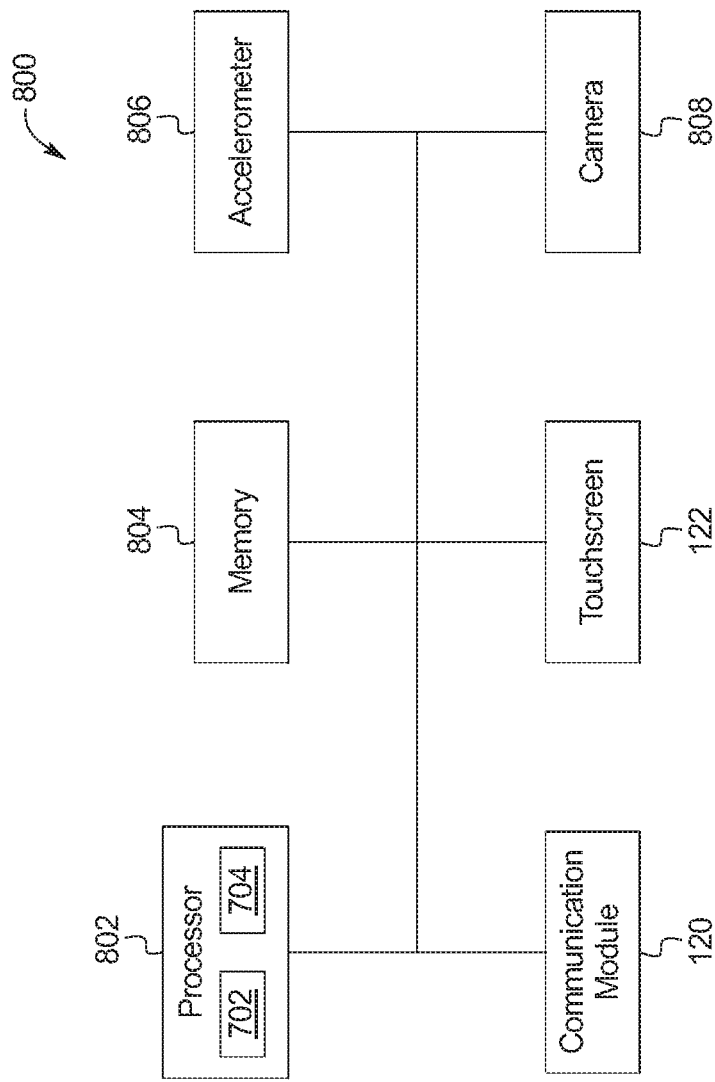
FIG. 8 is a block diagram of electronic components of the mobile device of FIGS. 1 and 7.

FIG. 8 is a block diagram of electronic components 800 of the mobile device 100. As illustrated in FIG. 8, the electronic components 800 of the mobile device 100 includes the communication module 120, the touchscreen 122, a processor 802, memory 804, an accelerometer 806, and a camera 808.

The processor 802 is structured to include the path former 702 and the parking initiator 704. Alternatively, in some examples, the path former 702 and/or the parking initiator 704 are incorporated into a processor (e.g., a processor 910 of FIG. 9) of the vehicle 102. The processor 802 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 804 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 804 includes multiple kinds of memory, particularly volatile memory and non-volatile memory.

The memory 804 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 804, the computer readable medium, and/or within the processor 802 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Further, the accelerometer 806 detects an orientation of the mobile device 100, an acceleration at which the mobile device 100 is moving, and/or a velocity at which the mobile device 100 is moving. In some examples, the path former 702 utilizes data collected from the accelerometer 806 to determine the orientation (e.g., portrait or landscape) and/or by which hand of the user 118 (e.g., left or right) the mobile device 100 is being held and/or to determine. For example, the camera 808 captures image(s) and/or video of an area adjacent to the mobile device 100. The path former 702 analyzes the image(s) and/or video captured by the camera 808 to determine whether the mobile device 100 is being held by the left hand or the right hand of the user 118.

Figure 9:
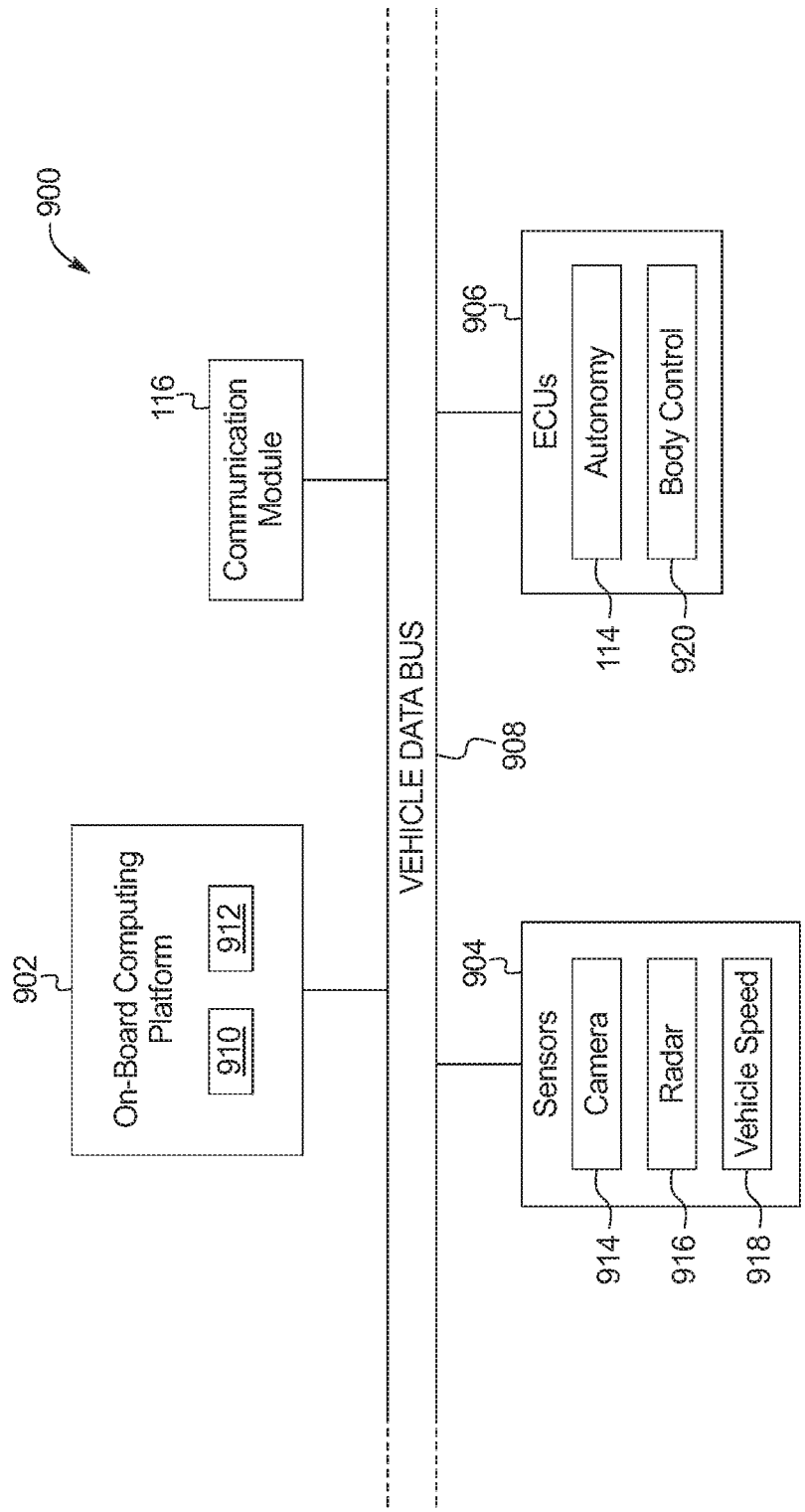
FIG. 9 is a block diagram of electronic components of the vehicle of FIGS. 1 and 7.

FIG. 9 is a block diagram of electronic components 900 of the vehicle 102. As illustrated in FIG. 9, the electronic components 900 of the vehicle 102 includes the communication module 116, an on-board computing platform 902, sensors 904, electronic control units 906 (ECUs), and a vehicle data bus 908.

The on-board computing platform 902 includes a microcontroller unit, controller or processor 910 and memory 912. The processor 910 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 912 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 912 includes multiple kinds of memory, particularly volatile memory and non-volatile memory.

The memory 912 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 912, the computer readable medium, and/or within the processor 910 during execution of the instructions.

The sensors 904 are arranged in and around the vehicle 102 to monitor properties of the vehicle 102 and/or an environment in which the vehicle 102 is located. One or more of the sensors 904 may be mounted to measure properties around an exterior of the vehicle 102. Additionally or alternatively, one or more of the sensors 904 may be mounted inside a cabin of the vehicle 102 or in a body of the vehicle 102 (e.g., an engine compartment, wheel wells, etc.) to measure properties in an interior of the vehicle 102. For example, the sensors 904 include accelerometers, odometers, tachometers, pitch and yaw sensors, wheel speed sensors, microphones, tire pressure sensors, biometric sensors and/or sensors of any other suitable type. In the illustrated example, the sensors 904 include a camera 914, a RADAR sensor 916, and a vehicle speed sensor 918. For example, the camera 914 obtains image(s) and/or video to enable detection and location of nearby object(s) and/or the RADAR sensor 916 detects and locates the nearby object(s) via radio waves to facilitate the autonomy unit 114 in autonomously parking the vehicle 102 into the available parking spot 104. Further, the vehicle speed sensor 918 monitors a speed of the vehicle 102 to facilitate the autonomy unit 114 in autonomously parking the vehicle 102.

The ECUs 906 monitor and control the subsystems of the vehicle 102. For example, the ECUs 906 are discrete sets of electronics that include their own circuit(s) (e.g., integrated circuits, microprocessors, memory, storage, etc.) and firmware, sensors, actuators, and/or mounting hardware. The ECUs 906 communicate and exchange information via a vehicle data bus (e.g., the vehicle data bus 908). Additionally, the ECUs 906 may communicate properties (e.g., status of the ECUs 906, sensor readings, control state, error and diagnostic codes, etc.) to and/or receive requests from each other. For example, the vehicle 102 may have seventy or more of the ECUs 906 that are positioned in various locations around the vehicle 102 and are communicatively coupled by the vehicle data bus 908. In the illustrated example, the ECUs 906 include the autonomy unit 114 and a body control module 920. The body control module 920 controls one or more subsystems throughout the vehicle 102, such as power windows, power locks, an immobilizer system, power mirrors, etc. For example, the body control module 920 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 908 communicatively couples the communication module 116, the on-board computing platform 902, the sensors 904, and the ECUs 906. In some examples, the vehicle data bus 908 includes one or more data buses isolated by a gateway module or gateway function in the communication module 116, the on-board computing platform 902, or the ECUs 906. The vehicle data bus 908 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 10:
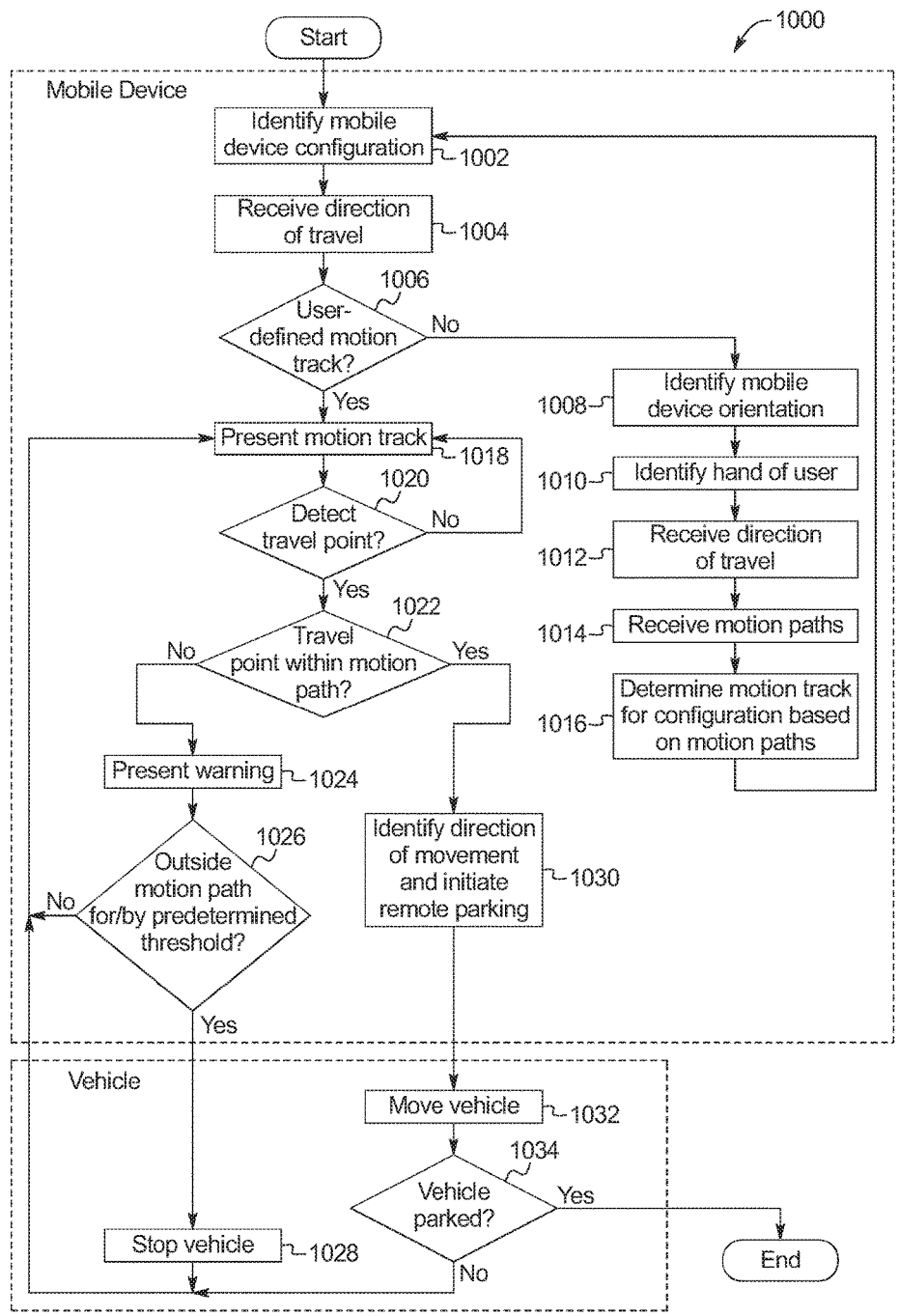
FIG. 10 is a flowchart for initiating remote parking of the vehicle of FIGS. 1 and 7 via the mobile device of FIGS. 1-7 in accordance with the teachings herein.

FIG. 10 is a flowchart of an example method 1000 to initiate remote parking of a vehicle via a mobile device. The flowchart of FIG. 10 is representative of machine readable instructions that are stored in memory (such as the memory 804 of FIG. 8) and include one or more programs which, when executed by a processor (such as the processor 802 of FIG. 8), cause the mobile device 100 to implement the example path former 702 and/or the example parking initiator 704 of FIGS. 7 and 8. Additionally or alternatively, flowchart of FIG. 10 is representative of machine readable instructions that are stored in memory (such as the memory 912 of FIG. 9) and include one or more programs which, when executed by a processor (such as the processor 910 of FIG. 9), cause the autonomy unit 114 to remotely park the vehicle 102 of FIGS. 1, 7, and 9. While the example program is described with reference to the flowchart illustrated in FIG. 10, many other methods for initiating remote parking of the vehicle 102 may alternatively be used. For example, the order of execution of the blocks may be rearranged, changed, eliminated, and/or combined to perform the method 1000. Further, because the method 1000 is disclosed in connection with the components of FIGS. 1-9, some functions of those components will not be described in detail below.

Initially, at block 1002, the path former 702 of the mobile device 100 identifies a configuration of the mobile device 100. For example, the path former 702 detects whether the mobile device 100 is in a portrait orientation or a landscape orientation and/or determines whether a right hand or a left hand of the user 118 is holding the mobile device 100. At block 1004, the touchscreen 122 receives a selection from the user 118 of a targeted direction of travel during remote parking of the vehicle 102. For example, the touchscreen 122 receives whether the vehicle 102 is to move in a forward direction or a backward direction during remote parking of the vehicle 102.

At block 1006, the path former 702 determines whether there is a motion track (e.g., the motion track 202, the motion track 402, the motion track 502, the motion track 602) that corresponds to the configuration of the mobile device 100 and the targeted direction of travel of the vehicle 102. For example, if the path former 702 determines that the mobile device 100 is in a portrait orientation and is being held by a left hand of the user 118 and the user 118 selects a forward motion of travel via the touchscreen 122, the path former 702 determines whether there is a motion track that has been predefined for the user 118 for instances in which the mobile device 100 is in the portrait orientation, the mobile device 100 is being held by the left hand, and forward motion is targeted.

In response to the path former 702 determining that there is not a motion track previously defined by the user 118 for the configuration of the mobile device 100 and the targeted direction of travel of the vehicle 102, the method 1000 proceeds to block 1008 at which the path former 702 identifies an orientation (e.g., a portrait orientation, a landscape orientation) of the mobile device 100. At block 1010, the path former 702 identifies which hand (e.g., right hand, left hand) of the user 118 is holding the mobile device 100. The path former 702 identifies the orientation of the mobile device 100 at block 1008 and the hand holding the mobile device 100 at block 1010 to identify the configuration of the mobile device 100 that is to correspond with the to-be-defined motion track. At block 1012, the path former 702 receives a targeted direction of travel that is detected by the touchscreen 122 and provided by the user 118. At block 1014, the path former 702 receives motion paths (e.g., the motion paths 302 of FIG. 3) via the touchscreen 122. At block 1016, the path former 702 determines a motion track for the configuration of the mobile device 100 and the targeted direction of travel of the vehicle 102 determined at blocks 1008, 1010, 1012 based on the motion paths received at block 1014. For example, at block 1016, the path former 702 determines the location, size, and shape of the motion track 202 based on the motion paths 302 received via the touchscreen 122.

Returning to block 1006, in response to the path former 702 determining that there is a motion track previously defined by the user 118 for the configuration of the mobile device 100 and the targeted direction of travel of the vehicle 102, the method 1000 proceeds to block 1018 at which the parking initiator 704 presents the motion path to the user 118 via the touchscreen 122. For example, the parking initiator 704 presents the display 200 that includes the motion track 202 (e.g., a first motion track) when the mobile device 100 is in the portrait orientation, the mobile device 100 is being held by the right hand of the user 118, and/or forward motion during remote parking of the vehicle 102 is to be initiated. Additionally or alternatively, the parking initiator 704 presents, via the touchscreen 122, the display 400 that includes the motion track 402 (e.g., a second motion track) when backward motion during remote parking of the vehicle 102 is to be initiated; presents, via the touchscreen 122, the display 500 that includes the motion track 502 (e.g., a third motion track) when the mobile device 100 is in the landscape orientation; and/or presents, via the touchscreen 122, the display 600 that includes the motion track 602 (e.g., a fourth motion track) when the mobile device 100 is being held by the left hand of the user 118.

At block 1020, the parking initiator 704 detects whether the user 118 has provided a travel point (e.g., the travel point 214) via the touchscreen 122. For example, the user 118 provides the travel point by pressing or touching the touchscreen 122. In response to the parking initiator 704 not detecting the travel point on the touchscreen 122, the method 1000 returns to block 1018. Otherwise, in response to the parking initiator 704 detecting the travel point on the touchscreen 122, the method 1000 proceeds to block 1022 at which the parking initiator 704 determines whether the travel point is moving within the motion path that is presented via the touchscreen 122.

In response to the parking initiator 704 determining that the travel point is not within the motion path, the method 1000 proceeds to block 1024 at which the parking initiator 704 presents a warning (e.g., audio, visual, haptic, etc.) to the user 118 to inform the user 118 that the travel point is positioned and/or moving outside of the motion path. At block 1026, the parking initiator 704 determines whether the travel point has been outside the motion path for at least a predetermined time threshold and/or by at least a predetermined distance threshold. In response to the parking initiator 704 determining that the travel point has not been outside the motion path for at least the predetermined time threshold or by at least the predetermined distance threshold, the method 1000 returns to block 1018. In response to the parking initiator 704 determining that the travel point has been outside the motion path for at least the predetermined time threshold or by at least the predetermined distance threshold, the method 1000 proceeds to block 1028 at which the parking initiator 704 sends the signal 124, via the communication module 120 and the communication module 116, to the autonomy unit 114 of the vehicle 102 to stop remote parking and/or other movement of the vehicle 102.

Returning to block 1022, in response to the parking initiator 704 determining that the travel point is within the motion path, the method 1000 proceeds to block 1030. At block 1030, the parking initiator 704 identifies a direction of movement of the travel point within the motion path and sends the signal 124 to the autonomy unit 114 of the vehicle 102 to initiate remote parking based on the identified direction of movement of the travel point within the motion path. For example, the parking initiator 704 sends the signal 124 to initiate forward motion during remote parking of the vehicle 102 in response to the parking initiator 704 determining that the travel point is moving in a clockwise direction within the motion path. Additionally or alternatively, the parking initiator 704 sends the signal 124 to initiate backward motion during remote parking of the vehicle 102 in response to the parking initiator 704 determining that the travel point is moving in a counterclockwise direction within the motion path. In other examples, the parking initiator 704 sends the signal 124 to initiate both forward and backward maneuvers during remote parking as determined by the autonomy unit 114 in response to the parking initiator 704 identifying motion of the travel point in a clockwise direction and/or a counterclockwise direction.

At block 1032, the autonomy unit 114 of the vehicle 102 moves the vehicle 102 based on the signal 124 to remotely park the vehicle 102 in the available parking spot 104. At block 1034, the autonomy unit 114 determines whether the vehicle 102 has been parked in the available parking spot 104. In response to the autonomy unit 114 determining that the vehicle 102 has not been parked in the available parking spot 104, the method 1000 returns to block 1018. In response to the autonomy unit 114 determining that the vehicle 102 has been parked in the available parking spot 104, the method 1000 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method for initiating vehicle remote parking, the method comprising:
   presenting, via a touchscreen of a mobile device, a first motion track that is predefined by a user and continuous;
   detecting a travel point of the user on the touchscreen;
   initiating forward motion during remote parking of a vehicle in response to determining, via a processor, the travel point is moving in a clockwise direction within the first motion track.

2. The method of claim 1, further including initiating backward motion during remote parking of the vehicle in response to determining the travel point is moving in a counterclockwise direction within the first motion track.

3. The method of claim 1, further including presenting a warning in response to determining the travel point is moving outside of the first motion track.

4. The method of claim 3, further including stopping remote parking of the vehicle in response to determining the travel point is moving outside of the first motion track for at least a predetermined time threshold.

5. The method of claim 1, further including detecting a plurality of motion paths received via the touchscreen from the user and defining the first motion track of the user based on the plurality of motion paths.

6. The method of claim 1, wherein a speed of motion of the travel point within the first motion track corresponds to a travel speed of the vehicle during remote parking.

7. The method of claim 1, further including presenting, via the touchscreen, a second motion track that is different than the first motion track, predefined by the user, and continuous.

8. The method of claim 7, wherein the second motion track has a different shape and a different location on the touchscreen relative to the first motion track.

9. The method of claim 8, further including presenting the first motion track to initiate forward motion during remote parking of the vehicle or presenting the second motion track to initiate backward motion during remote parking of the vehicle.

10. The method of claim 9, further including, when the second motion track is presented via the touchscreen, initiating the backward motion during remote parking of the vehicle in response to determining that the travel point is moving in a counterclockwise direction within the second motion track.

11. The method of claim 1, further including presenting, via the touchscreen, a third motion track that is different than the first motion track, predefined by the user, and continuous.

12. The method of claim 11, further including:
   presenting the first motion track via the touchscreen in response to detecting the mobile device is in a portrait orientation; and presenting the third motion track via the touchscreen in response to detecting the mobile device is in a landscape orientation.

13. The method of claim 1, further including presenting, via the touchscreen, a fourth motion track that is different than the first motion track, predefined by the user, and continuous.

14. The method of claim 13, further including:
presenting the first motion track via the touchscreen in response to detecting a right hand of the user is holding the mobile device; and
presenting the fourth motion track via the touchscreen in response to detecting a left hand of the user is holding the mobile device.

15. The method of claim 14, further including determining whether the left hand or the right hand of the user is holding the mobile device via at least one of a camera and an accelerometer of the mobile device.

16. A tangible non-transitory computer readable medium including instructions which, when executed, cause a machine to: present, via a touchscreen of a mobile device, a first motion track that is predefined by a user and continuous; detect a travel point of the user on the touchscreen; initiate remote parking of a vehicle in response to determining, via a processor, the travel point is moving within the first motion track.

17. The tangible non-transitory tangible computer readable medium of claim 16, wherein the instructions, when executed further cause the machine to cause the first motion track to float on the touchscreen to enable the user to adjust a location of the first motion track on the touchscreen.

18. The tangible non-transitory tangible computer readable medium of claim 16, wherein the instructions, when executed further cause the machine to: present a warning via the mobile device in response to determining the travel point is moving outside of the first motion track; and stop remote parking of the vehicle in response to determining the travel point is moving outside of the first motion track for at least a predetermined time threshold.

19. The tangible non-transitory tangible computer readable medium of claim 16, wherein the instructions, when executed further cause the machine to detect a plurality of motion paths provided by the user on the touchscreen and define the first motion track of the user based on the plurality of motion paths.

20. The tangible non-transitory tangible computer readable medium of claim 16, wherein the instructions, when executed further cause the machine to at least one of prevents the user from defining and presents a warning when the user attempts to define the first motion track along an edge of the touchscreen.

* * * * *